(12) United States Patent
Loeffler et al.

(10) Patent No.: US 11,646,619 B2
(45) Date of Patent: May 9, 2023

(54) ELECTRONICALLY COMMUTATED MACHINE, ELECTRONICALLY SLIP-CONTROLLABLE BRAKE SYSTEM AND METHOD FOR MANUFACTURING AN ELECTRONICALLY COMMUTATED MACHINE

(71) Applicant: Robert Bosch GmbH, Stuttgart (DE)

(72) Inventors: Michael Loeffler, Oberstaufen (DE); Michael Schlitzkus, Dietmannsried (DE); Thomas Zander, Oberstaufen (DE)

(73) Assignee: Robert Bosch GmbH, Stuttgart (DE)

( * ) Notice: Subject to any disclaimer, the term of this patent is extended or adjusted under 35 U.S.C. 154(b) by 106 days.

(21) Appl. No.: 17/223,651

(22) Filed: Apr. 6, 2021

(65) Prior Publication Data

US 2021/0328468 A1 Oct. 21, 2021

(30) Foreign Application Priority Data

Apr. 16, 2020 (DE) ...................... 10 2020 204 831.2

(51) Int. Cl.
*H02K 1/28* (2006.01)
*H02K 21/24* (2006.01)
*H02K 29/08* (2006.01)
*H02K 1/2706* (2022.01)
*H02K 11/00* (2016.01)

(52) U.S. Cl.
CPC ............. *H02K 1/28* (2013.01); *H02K 1/2706* (2013.01); *H02K 21/24* (2013.01); *H02K 29/08* (2013.01)

(58) Field of Classification Search
CPC .... H02K 11/0021; H02K 11/00; H02K 21/24; H02K 1/2706; H02K 1/28

USPC ....................................................... 310/68 B
See application file for complete search history.

(56) References Cited

U.S. PATENT DOCUMENTS

| 2008/0272660 | A1* | 11/2008 | Becker | G01P 1/04 |
| | | | | 310/43 |
| 2016/0141940 | A1* | 5/2016 | Hager | F16D 1/06 |
| | | | | 403/341 |
| 2020/0099269 | A1* | 3/2020 | Suzuki | H02K 5/10 |
| 2020/0153314 | A1* | 5/2020 | Iwasaki | H02K 7/003 |

FOREIGN PATENT DOCUMENTS

| DE | 102015208262 A1 * | 11/2016 | |
| JP | 3990900 B2 * | 10/2007 | |
| WO | WO-2019001629 A1 * | 1/2019 | ............. G01D 18/00 |
| WO | WO-2019132389 A1 * | 7/2019 | ............. G01D 5/145 |

OTHER PUBLICATIONS

Machine Translation WO2019001629 (Year: 2019).*
Machine Translation DE102015208262 (Year: 2015).*

* cited by examiner

*Primary Examiner* — Jose A Gonzalez Quinones
(74) *Attorney, Agent, or Firm* — Maginot, Moore & Beck LLP

(57) ABSTRACT

An electronically commutated machine, in particular an electronically commutated electric motor is disclosed. To detect an angle of rotation completed by a rotor shaft of the machine or a rotational speed, this rotor shaft is equipped with a signal generator of a sensor device. This latter component has a magnet element, which is fastened on the rotor shaft by way of a holding element. A clamping body is included, which is arranged on the rotor shaft with force fit and onto which the holding element is pressed.

16 Claims, 3 Drawing Sheets

ELECTRONICALLY COMMUTATED MACHINE, ELECTRONICALLY SLIP-CONTROLLABLE BRAKE SYSTEM AND METHOD FOR MANUFACTURING AN ELECTRONICALLY COMMUTATED MACHINE

This application claims priority under 35 U.S.C. § 119 to patent application no. DE 10 2020 204 831.2, filed on Apr. 16, 2020 in Germany, the disclosure of which is incorporated herein by reference in its entirety.

BACKGROUND

The present disclosure relates to an electronically commutated machine, an electronically slip-controllable brake system, and a method for manufacturing an electronically commutated machine.

Electronically commutated machines are used, for example, as drive assemblies in electronically slip-controllable brake systems of motor vehicles in order to drive a pressure generator for the purpose of brake pressure regulation. In this case, the electrical control of the machines is implemented according to requirements by an electronic control unit of the brake system. In the case of the electrical control, the pressure generator conveys a pressurizing medium within a brake circuit. A brake pressure then builds up in connected wheel brakes, proportionally to the conveyed pressurizing medium volume. With the aid of additional control devices which can be controlled by the electronic control unit, this brake pressure can be adapted at each individual wheel to the slip ratios which currently prevail at the respectively associated wheels of the vehicle. Wheels can thus be prevented from locking during a braking procedure and the vehicle stability of a vehicle can therefore be improved. Moreover, braking procedures can be carried out independently of the driver, depending on the traffic or driving situation at the time.

The volume of pressurizing medium which is displaced by the pressure generator represents a significant control variable in these regulating procedures. This can be determined electronically. To this end, existing sensor devices detect the angle of rotation and/or the rotational speed of the rotor of the drive assembly and transmit the measured signal to the electronic control unit for relevant evaluation. Optimal dynamics for controlling the motor can thus be achieved.

Such sensor devices are composed of a signal generator revolving with the motor shaft and a signal receiver arranged in a stationary manner. Known signal generators are equipped with magnet elements.

One known electronically commutated machine is disclosed in DE 10 2017 218 648 A1, for example. The known machine is a drive assembly for a pressure generator of an electronically slip-controllable vehicle brake system, which is illustrated in a side view in FIG. 1 for the sake of simplicity.

This known drive assembly (10) comprises an electronically commutated electric motor (12) having a rotor (14) which can be driven for rotational movement and a rotor shaft (16) connected to the rotor (14) in a torsion-resistant manner. The rotor (14) is constructed in a conventional manner and has an iron core and a plurality of permanent magnets arranged adjacent to one another in the circumferential direction of this iron core.

The magnetic fields of these permanent magnets of the rotor (14) cooperate with the magnetic fields of electric coils of a stator in a known manner. The stator comprises a housing (18) of the drive assembly (10), which is equipped with the electric coils on its inner surface which is opposite the permanent magnets. The rotor (14) and the rotor shaft (16) execute a common rotational movement owing to the interaction between the magnetic fields.

To this end, by way of example, the rotor shaft (16) is rotatably mounted in the housing (18) of the drive assembly (10) by means of roller bearings (20). As an example, according to FIG. 1, a plurality of eccentric elements (22) are arranged on the rotor shaft (16) in order to actuate devices (not shown), for example piston pumps, which are arranged transversely to the longitudinal axis L of the rotor shaft (16).

The detail II according to FIG. 1 shows a signal generator (24) of a sensor device for electronically detecting and evaluating the angle of rotation and/or the rotational speed of the rotor (14) or the rotor shaft (16). This signal generator (24) is arranged on the end of the rotor shaft (16) which is remote from the rotor (14). It has a magnet element, which is indirectly fastened on the rotor shaft (16) via a holding element (28). The holding element (28) is formed in the shape of a cup and has a protruding pin (30) with which it is pressed into an associated centering bore (32) of the motor shaft (16) and bonded therein (not shown). On the opposite side of the holding element (28), an outwardly open receptacle (34) is formed in the manner of a blind hole, in which the magnet element (26) is inserted in an externally flush manner. The securing of the magnet element (26) in the receptacle (34) of the holding element (28) likewise takes place by means of a bonded connection (not shown).

Under operating conditions of this drive assembly, the rotor (14) is often greatly accelerated or decelerated. In this case, the bonded connections are exposed to high thermal and dynamic loads. Moreover, the magnet element attracts metallic impurities from the environment and is therefore prone to contamination. Furthermore, high costs are incurred during the manufacture of the holding element and the centering bore of the rotor shaft. Finally, the axial end position of the magnet element and its coaxiality relative to the rotor axis are subject to relatively high tolerances.

SUMMARY

In contrast, an electronically commutated machine according to the present disclosure has the advantage that the fastening of the signal generator on the rotor shaft is executed in a more reliable and precise manner. As a result of this, the detection of the angle of rotation signal or the rotational speed takes place with greater accuracy, which is ultimately associated with an improvement in the electrical controllability of the machine and therefore with a reduction in possible deviations between the actual conveyed pressurizing medium volume and a desired target value, or the actual established brake pressure and a desired brake pressure. Apart from this, the manufacturing process of the machine is simplified for mass production.

In the manner proposed, these advantages are achieved by a holding element which is fixed on the rotor shaft with force fit by means of a clamping body. A possible clamping body can be, for example, a tolerance ring. It lies in a gap between an inner contour of the holding element and an outer contour of the rotor shaft and enables the use of a cost-effective rotor shaft which does not require a specific structural configuration for fastening the signal generator and can therefore have a cylindrical design with a continuous shaft diameter. Furthermore, a holding element with increased radial dimensions can be used due to the clamping body. Such a holding element offers a larger installation space for the magnet element so that larger magnet elements, i.e. magnet elements which project beyond the cross-section of the rotor shaft, can be used. Such magnet elements have a correspondingly stronger and more homogenous magnetic field, which can be detected and evaluated more easily by the signal receiver. Consequently, the determination of the travelled angle of rotation or the rotational speed of the rotor shaft takes place with greater precision and higher tolerances between the signal receiver and the magnet element of the signal generator are possible. This in turn simplifies the interchangeability of components such as the control unit and the electric machine, for example.

Further advantages and advantageous developments of the disclosure are revealed in the description below.

As a result of the closed base of the holding element, which covers the end face of the magnet element, the magnet element is arranged in the interior of the holding element and is protected against damage and contamination, both during assembly and also during subsequent operation.

By way of a tolerance compensating element made from elastic material, which can be arranged as required between the rotor shaft and the magnet element, the spacing between the magnet element and the rotor shaft in the direction of the longitudinal axis L of the rotor shaft can be set relatively precisely and kept within tight limits. Moreover, an axial play of the magnet element in the interior of the holding element and a negative influence on the magnetic field of the magnet element as a result of the metallic rotor shaft can thus be prevented.

Alternatively, the magnetic element can be bonded into the holding element in a pre-assembly step. In this solution, an air gap between the magnetic element and the rotor shaft in the axial direction is sufficient to prevent the magnetic field of the magnetic element being influenced by the rotor shaft. A separate tolerance compensating element can then be omitted.

A clamping body in the form of a resilient, radially open sleeve can be easily mounted on the machine shaft and preferably secured thereon under radial pre-tension. In combination with a holding element which is in turn pressed on this clamping body under radial pre-tension, a reliable anchoring of the holding element equipped with the magnet element on the rotor shaft is achieved, which anchoring is, in particular, self-centering during assembly.

The clamping body compensates tolerances during the manufacture of the holding element, whereby this holding element can be manufactured using a shaping technique and therefore particularly cost-effectively, for example in a deep drawing process.

The magnet element can be secured in the interior of the holding element as required by means of a press connection and/or by means of a bonded connection. In this case, the holding element can be constructed such that it has a plurality of bearing points for the magnet element, which define a space between the magnet element and the holding element which can be filled with bonding material. The cross-section of this space can be represented in variable ways and can therefore be adapted to different thermal expansions.

It makes sense to only mount the holding element on a housing once the electric machine has been assembled in order to thereby position the holding element relative to the housing. The axial dimensions, including assembly tolerances which occur, can thus be minimized.

All in all, sensor devices having signal generators formed in this way are notable for their high precision and nonetheless favorable costs.

BRIEF DESCRIPTION OF THE DRAWINGS

The invention is illustrated in the drawing and will be explained in detail in the description below. To this end, the drawing comprises a plurality of figures in which mutually corresponding components are uniformly denoted by the same reference signs. In detail.

DETAILED DESCRIPTION

Figure 2:
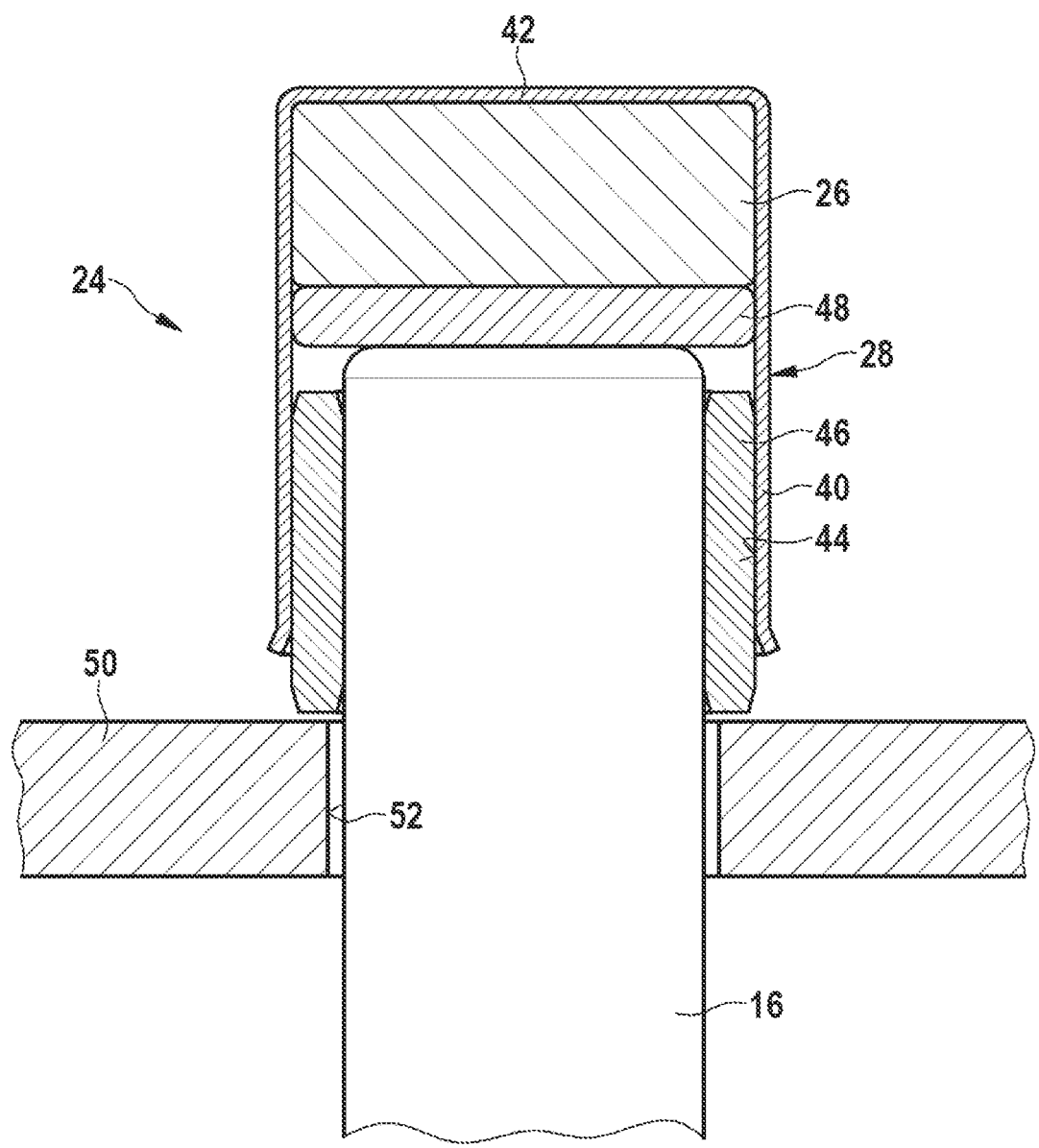
FIG. 2 shows the detail II according to FIG. 1 in a first embodiment of the present disclosure.

The end of the rotor shaft (16) of an electronically commutated machine which is remote from the rotor is illustrated in FIG. 2. This end of the rotor shaft (16) supports the signal generator (24). This latter comprises the magnet element (26), which is arranged in the interior of the holding element (28) and is fastened on the rotor shaft (16) in a torsion-resistant manner by means of this holding element (28).

To this end, the holding element (28) is formed in the shape of a cup and has a hollow cylindrical shank (40), which is closed at one of its ends by a base (42). The holding element (28) is pushed with its open end onto the rotor shaft (16) so that a portion of the shank (40) and a portion of the rotor shaft (16) overlap. The base (42) moreover covers an end face of the magnet element (26) which is remote from the rotor shaft (16). Bearing points for the magnet element (26) can be formed on the base (42) in order to define a cross-section of a bonding gap between the magnet element (26) and the holding element (28) if the intention is for the magnet element (26) to be bonded into the holding element (42). The configuration and arrangement of bearing points on the holding element (28) will be discussed in more detail in connection with the description of FIG. 3.

In terms of its radial outer dimensions, the holding element (28) is designed to be larger than the rotor shaft. A gap (44) surrounding the rotor shaft is thus established between the outer circumference of the rotor shaft (16) and the inner contour of the shank (40) of the holding element (28).

A clamping body (46) designed in the shape of a sleeve lies in the gap (44) between the rotor shaft (16) and the holding element (28), which clamping body abuts with its inner circumference against the outer circumference of the rotor shaft (16), and with its outer circumference against the inner circumference of the holding element (28), in a flush manner. In an advantageous development, this clamping body (46) can be designed as a radially open or slotted sleeve, which can be elastically widened to assemble it on the rotor shaft (16). The clamping body (46) and the holding element (28) are matched to one another in terms of their dimensions and their material properties in such a way that, in the assembled state, relative movements between the rotor shaft (16) and the assembled signal generator (24) are reliably prevented.

The closed base (42) of the holding element (28) projects radially beyond the end face of the rotor shaft (16). Moreover, an axial spacing is present between the base (42) and the end face of the rotor shaft (16). This results in a relatively large installation space in the interior of the holding element (28), in which the correspondingly large-dimensioned magnet element (26) of the signal generator (24) is received. This magnet element (26), at least in some portions, abuts with its end face against the base (42) of the holding element (28) and with its circumference against the shank (40) of the holding element (28) in a flush manner. A force-fitting connection, for example a press connection, and/or a material fitting connection, for example a bonded connection, can be provided between the magnet element (26) and the holding element (28) for mutually securing the components. When using a bonded connection, bearing points (FIG. 3) can be formed on the holding element (28) in order to define a bonding gap which can be filled with bonding agent between the magnet element (26) and the holding element (28). The cross-section of this bonding gap can be optimized with regard to the different thermal loads which occur.

Additionally or alternatively, in the illustrated exemplary embodiment according to FIG. 2, a tolerance compensating element (48) is additionally present between the magnet element (26) and the end face of the rotor shaft (16). This tolerance compensating element (48) is designed in a disc shape and abuts against the end face of the rotor shaft (16) on the one hand and against the opposing end face of the magnet element (26) on the other. It consists of elastic material, for example silicone, and therefore enables the adjustability of the total length of the assembly group during the assembly of the signal generator (24). The tolerance compensating element (48) moreover hinders the expansion, and therefore weakening, of the magnetic field of the magnet element (26) in the direction of the rotor shaft (16) and moreover prevents axial play from occurring between the rotor shaft end and the magnet element (26).

FIG. 2 moreover shows an assembly aid (50) which is no longer present after assembly. With the aid of this assembly aid (50), the signal generator (24) can be fastened on the rotor shaft (16) without axial forces thereby being applied to this rotor shaft (16). Axial forces on the rotor shaft (16) should be prevented as they could result in damage to the already established bearing of the rotor shaft (16) in the electrically commutated machine.

The assembly aid (50) is an assembly plate with a laterally open, slot-shaped recess (52). This is designed to receive the rotor shaft (16) circumferentially with radial play.

To assemble the signal generator (24), the rotor shaft (16) is therefore inserted laterally into the recess (52) so that a portion of the rotor shaft (16) projects beyond the assembly aid (50) on one side. This portion of the rotor shaft (16) is provided for fastening the signal generator (24).

To this end, the clamping body (46) is firstly fastened on the rotor shaft (16). In the case of a clamping body (46) in the form of a slotted sleeve made from elastic material, this can be widened in terms of its diameter and snapped laterally onto the rotor shaft (16) with its opening at the front. The rotor shaft (16) is therefore not exposed to any axial forces during the assembly of the clamping body (46). In the assembled state, the clamping body (46) abuts with the end face of one of its ends against the assembly aid (50).

The holding element (28), which is meanwhile equipped with the magnet element (26) and possibly with the tolerance compensating element (48) to form a structural unit, is then pushed with its open end onto the clamping body (46) from that side which is remote from the assembly aid (50) and is thereby pressed onto the outer circumference of this clamping body (46). To this end, an axial force is applied to the equipped holding element (28) until it has assumed its end position. The axial force which occurs during this is transferred to the assembly aid (50) via the clamping body (46) and dispersed by the assembly aid (50) without putting a strain on the rotor shaft (16).

In the end position of the holding element (28), the possibly present tolerance compensating element (48) abuts against the end face of the magnet element (26) on the one hand and against the end face of the rotor shaft (16) on the other. Moreover, the unit comprising the rotor shaft (16) and the mounted signal generator (24) has a total length which is within a predetermined tolerance range. The predetermined total length can be set within tight limits owing to the possible deformation of the tolerance compensating element (48) when pressing the holding element (28) onto the fastening ring (46). An axial gap between the signal generator (24) and the associated signal receiver (not illustrated) can in turn be defined via the total length.

Owing to the sleeve-shaped form of the clamping body (46) arranged on the rotor shaft (16) in conjunction with the cylindrical form of the shank (40) of the holding element (28), good centering of the signal generator (24) on the rotor shaft (16) is, at the same time, achieved when this holding element (28) is pressed onto the clamping body (46) and the overlap between the components is generated thereby.

Figure 1:
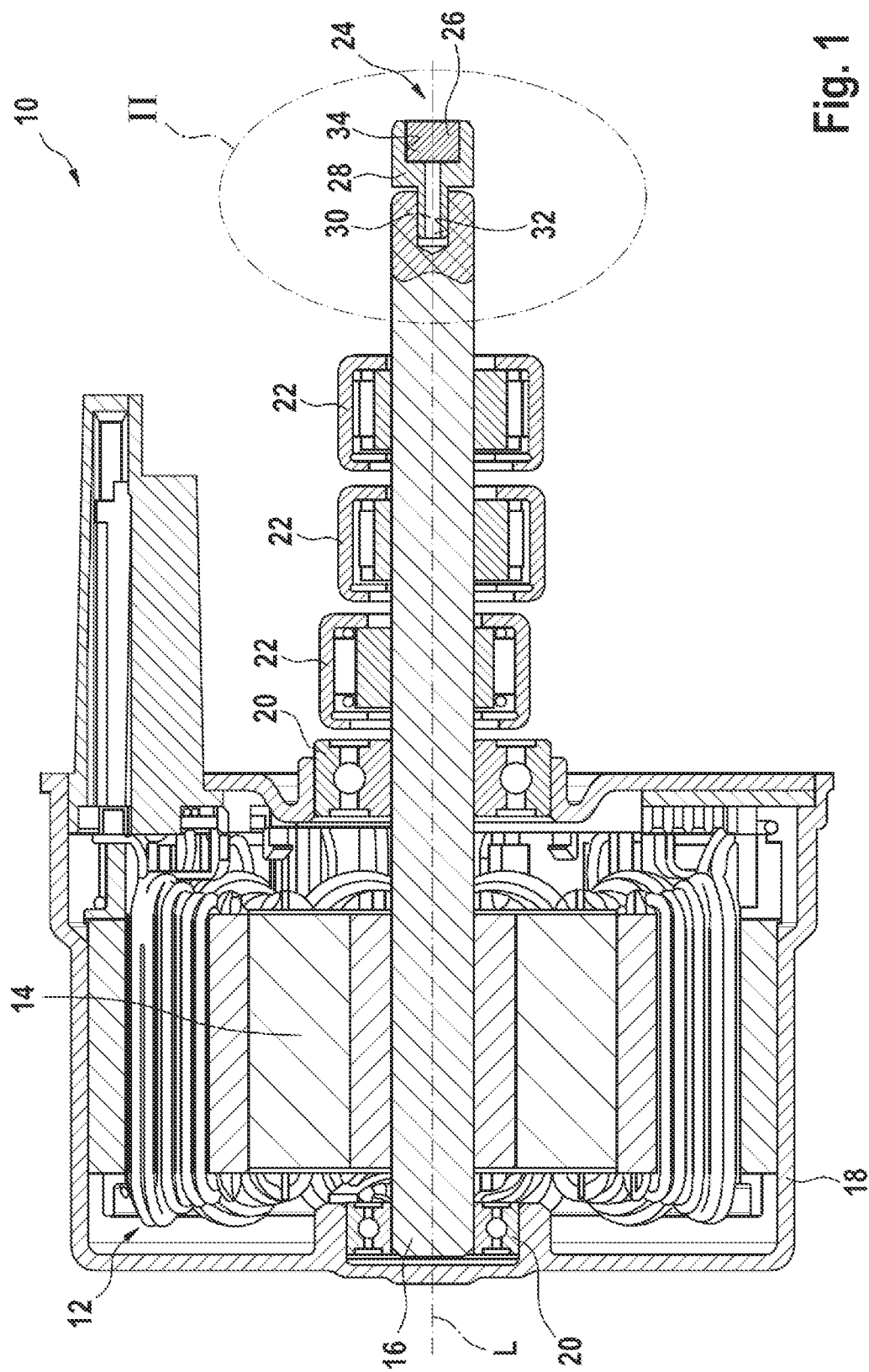
FIG. 1 shows the electronically commutated machine already explained at the outset in a side view.
Figure 3:
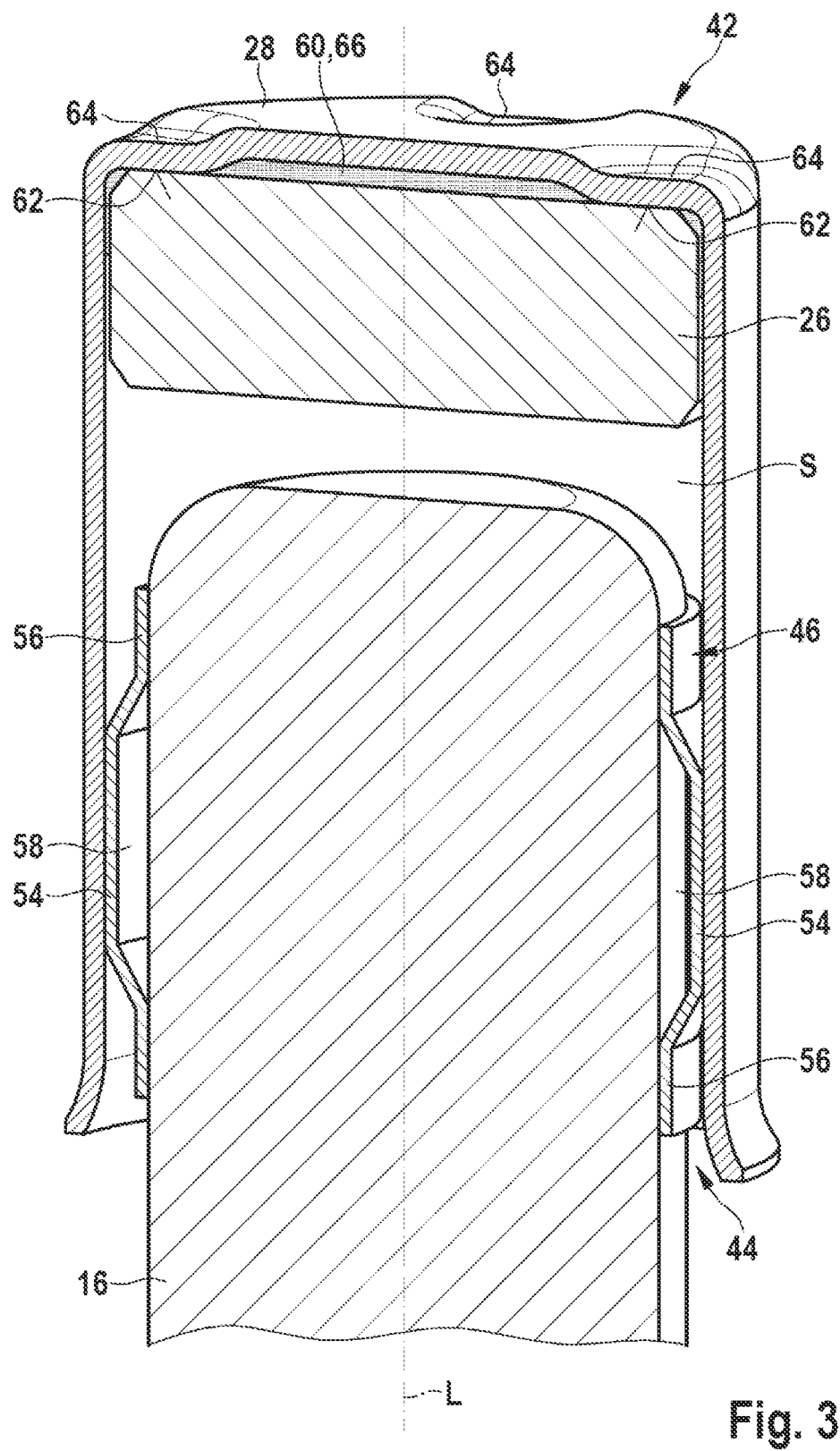
FIG. 3 shows the detail II according to FIG. 1 in a second embodiment of the present disclosure.

FIG. 3 shows a second variant embodiment of the disclosure with the aid of a perspective illustration of the detail II according to FIG. 1.

In this second exemplary embodiment, a tolerance ring is used as a clamping body (46) for centric fastening of the holding element (28) equipped with the magnet element (26) on the rotor shaft (16). This tolerance ring is arranged in the gap (44) between the outer diameter of the rotor shaft (16) and the inner diameter of the holding element (28). It is designed in the shape of a sleeve and consists of a spring plate which is bent to form a virtually closed ring. This ring is designed such that its inner diameter is somewhat smaller than the outer diameter of the rotor shaft (16). A plurality of molded portions (54) are formed at a mutual spacing from one another along the circumferential surface of this ring, which molded portions extend in each case over a sub-area of the width of the tolerance ring. The molded portions (54) increase the outer dimensions of the clamping body (46) and taper continuously at edges (56) which determine the inner diameter of this clamping body (46).

The clamping body (46) is fixed on the outer circumference of the free end of the rotor shaft (16) under radial pre-tension, whilst cavities (58) are produced between the rotor shaft (16) and the clamping body (46) in the regions of the molded portions (54). These cavities (58) lend the clamping body (46) a degree of elasticity in the radial direction, which can be defined by the construction of the molded portions (54) according to the specific application.

The holding element (28) equipped with the magnet element (26) is pressed with its open end onto the molded portions (54) of the clamping body (46). The outer dimensions of these molded portions (54) and the inner diameter of the holding element (28) are accordingly matched to one another such that the holding element (28) acts on the molded portions (54) with a pre-tension which is directed radially inwards, i.e. towards the longitudinal axis L of the rotor shaft (16). This radial pre-tension is transferred to the edges (56) of the clamping body (46) via the molded portions (54) and therefore contributes to a force-fitting and torsion-resistant anchoring of the clamping body (46) and the holding element (28) on the rotor shaft (16).

The magnet element (26) is arranged in the interior of the holding element (28). In the exemplary embodiment according to FIG. 3, this magnet element is fastened on the base (42) of the holding element (28) via a bonded connection (60). An air gap S is present between an end face of the magnet element (26) which faces the rotor shaft (16) and the rotor shaft (16) itself, which air gap, owing to its dimensions, prevents a possibly disruptive influence of the metallic rotor shaft (16) on the magnetic field of the magnet element (26).

To form mechanical bearing surfaces (62) for the magnet element (26) in the interior of the holding element (28), a plurality of stamped portions (64) are provided on the base (42) of this holding element (28), distributed over its circumference. By way of example, these stamped portions are formed as outwardly open grooves with a flat bottom, proceed radially with respect to the center of the base (42) of the holding element (28), but only extend along the outer edge portion of this base (42). A relatively large central region (66), which can be filled with bonding material for fastening the magnet element (26) in place, is thus formed in the interior of the holding element (28), which central region has radial extensions which stretch between the stamped portions (64) of the holding element (28). The cross-section of the bonded connection (60) between the magnet element (26) and the holding element (28) can be adapted to different thermal expansion properties by the number and configuration of these stamped portions (64).

It goes without saying that modifications or additions to the described invention further to the explanations above are possible without deviating from the scope of protection defined by the claims.

What is claimed is:

1. An electronically commutated machine, comprising:
    a rotor shaft;
    a rotor supported on the rotor shaft, the rotor being configured for rotational movement,
    a signal generator fastened on the rotor shaft in a torsion-resistant manner, the signal generator having (i) a holding element formed in the shape of a cup and that includes a shank and a closed base at one end of the shank, (ii) a magnet element which is anchored on the rotor shaft in a torsion-resistant manner by the holding element, and (iii) a clamping body,
    wherein the holding element is fixed on the rotor shaft by the clamping body, and
    wherein the clamping body is located in a gap defined between the holding element and the rotor shaft, and
    wherein the closed base covers an end face of the magnet element that is remote from the rotor shaft.

2. The electronically commutated machine of claim 1, wherein:
    the holding element has an interior surface that includes (i) a bearing surface that contacts the magnetic element, and (ii) a central surface spaced apart from the magnet element,
    a bonding space is formed between central surface of the holding element and the magnet element when the bearing surface of the holding element is positioned in contact with the magnet element, and
    the bonding space is filled with a bonding material.

3. The electronically commutated machine of claim 1, wherein:
    the closed base includes the bearing surface and the central surface,
    the magnet element is received in an interior of the holding element and is arranged between the closed base and an end of the rotor shaft.

4. The electronically commutated machine of claim 2, wherein an axial air gap is defined between the magnet element and an end of the rotor shaft when the magnet element is fastened in the holding element by way of the bonding material located in the bonding space.

5. The electronically commutated machine of claim 1, wherein the clamping body is formed as a radially open sleeve made from a resilient material.

6. The electronically commutated machine of claim 1, wherein the holding element is fixed on an outer circumference of the clamping body under radial pre-tension, at least in some portions.

7. The electronically commutated machine of claim 1, wherein the holding element is formed in one piece using a shaping technique.

8. The electronically commutated machine of claim 1, wherein:
    the signal generator further has a tolerance compensating element arranged between the magnet element and an end of the rotor shaft when the magnet element is fastened in the holding element, and
    the magnet element and the tolerance compensating element are held without play between the holding element and the end of the rotor shaft as viewed in a direction of a longitudinal axis of the rotor shaft.

9. The electronically commutated machine of claim 1, wherein the magnet element is secured on the holding element with force fit by way of a press connection, and/or material fit by way of a bonded connection.

10. An electronically slip-controllable brake system for a motor vehicle, comprising:
    a pressure generator, and
    the electronically commutated machine of claim 1 for driving the pressure generator.

11. A method for manufacturing an electronically commutated machine having (i) a rotor shaft, (ii) a rotor on the rotor shaft which can be actuated for rotational movement, (iii) a signal generator fastened on the rotor shaft in a torsion-resistant manner, the signal generator having (a) a holding element formed in the shape of a cup and that includes a shank and a closed base at one end of the shank, (b) a magnet element which is anchored on the rotor shaft in a torsion-resistant manner by the holding element in such a way that the closed base covers an end face of the magnet element that is remote from the rotor shaft, and (c) a clamping body, the method comprising:
    arranging the clamping body on the rotor shaft,
    pressing the holding element equipped with the magnet element onto an outer circumference of the clamping body after the clamping body has been arranged on the rotor shaft.

12. The method of claim 11, further comprising:
    supporting the clamping body on an assembly aid while the clamping body is being arranged on the rotor shaft, and
    pressing the holding element onto the clamping body during the arranging of the clamping body on the rotor shaft.

13. The electronically commutated machine of claim 1, wherein the electronically commutated machine is an electrically commutated motor.

14. The electronically commutated machine of claim 1, wherein:
    the signal generator further has a tolerance compensating element arranged between the magnet element and an end of the rotor shaft when the magnet element is fastened in the holding element, the tolerance compensating element includes an elastic material, and the elastic material is force fit in the holding element by way of a press connection between the elastic material and the shank.

15. The electronically commutated machine of claim 14, wherein the elastic material includes silicone.

16. The electronically commutated machine of claim 7, wherein the shaping technique is a deep drawing process.

* * * * *